Dec. 2, 1941.   W. C. ROBINSON ET AL   2,264,553
METER MOUNTING
Filed Dec. 28, 1939
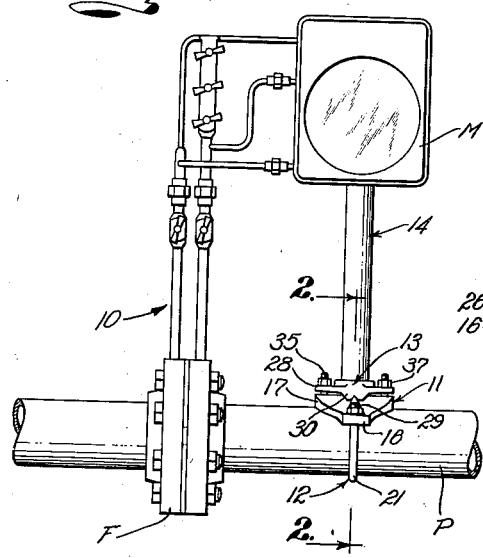
Fig. 1.
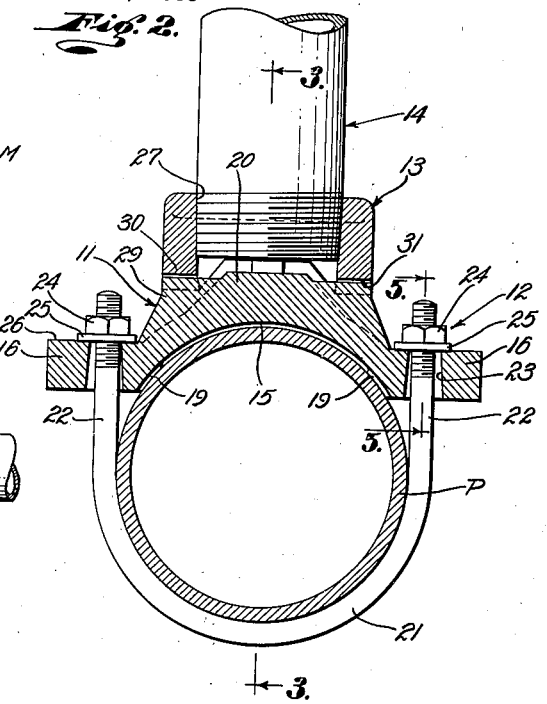
Fig. 2.
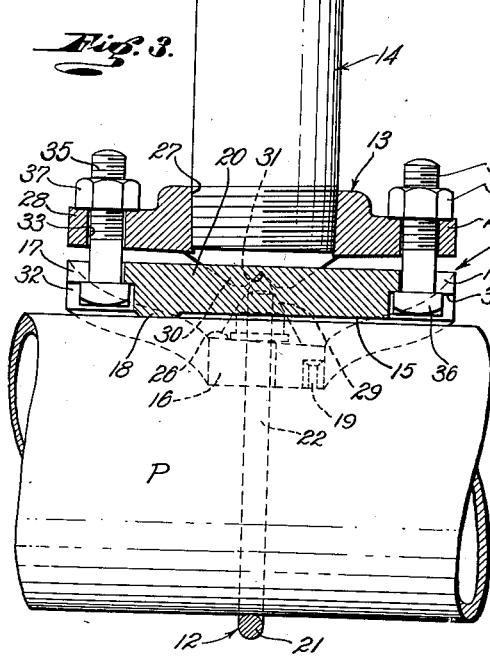
Fig. 3.
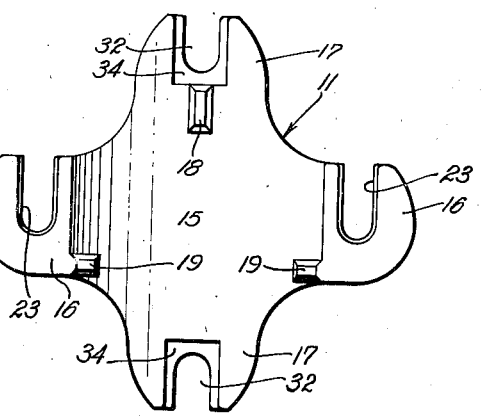
Fig. 4.
Fig. 5.
Inventors
WILLIAM C. ROBINSON
and PATRICK H. ROBINSON
By W. H. Cadwell
Their Attorney Patented Dec. 2, 1941

2,264,553

UNITED STATES PATENT OFFICE 2,264,553

METER MOUNTING

William C. Robinson and Patrick Henry Robinson, Los Angeles, Calif.

Application December 28, 1939, Serial No. 311,384

6 Claims. (Cl. 248—346)

This invention relates to meter mountings and relates more particularly to means for mounting orifice meters employed to meter the flow through pipe lines, etc. A general object of this invention is to provide a simple, practical and particularly effective meter mounting of the character mentioned.

Another object of this invention is to provide a saddle or mounting attachable to a pipe, or the like, and operable to dependably support the meter in a true vertical position.

Another object of this invention is to provide a meter mounting of the character mentioned that will correctly support the meter on a sloping, irregular, or distorted pipe or pipe line part.

Another object of this invention is to provide a meter mounting of the character mentioned that may be easily and quickly installed and adjusted to support the meter in the correct position.

Another object of this invention is to provide a meter mounting of the character mentioned that may be quickly and dependably secured to the pipe line to securely support the meter.

Another object of this invention is to provide a meter mounting of the character mentioned that embodies a novel means for securing the saddle or base to the pipe that is quickly applied and that is dependably held against loosening and displacement.

A further object of this invention is to provide a meter mounting of the character mentioned embodying a saddle or base secured to the pipe and a head for carrying the post of the meter and secured to the saddle in such a manner that it may be pivoted or tilted to bring the meter to its correct operative position.

The various objects and features of our invention will be fully understood from the following detailed description of a typical preferred form and application of the invention, throughout which description reference is made to the accompanying drawing, in which:

Fig. 1 is a side elevation of the meter mounting of the present invention supporting a typical orifice meter on a pipe line. Fig. 2 is an enlarged vertical detailed sectional view of the mounting taken as indicated by line 2—2 on Fig. 1. Fig. 3 is an enlarged vertical detailed sectional view taken as indicated by line 3—3 on Fig. 2. Fig. 4 is a bottom view of the saddle or base and Fig. 5 is a fragmentary vertical detailed sectional view taken as indicated by line 5—5 on Fig. 2.

The device of the present invention may be employed to support or mount meters of various classes and may be installed on conduits, pipe lines, and fluid handling systems varying considerably in character. In the drawing I have shown the mounting of the invention supporting a typical orifice meter M on a pipe P equipped with an orifice fitting F. The usual pipes and connections 10 extend from the fitting F to the meter M. The present invention is not primarily concerned with the details of the meter M, the fitting F, the pipes 10, or the pipe connections, and is not to be construed as limited for use in connection with the particular equipment illustrated.

The improved meter mounting of the present invention may be said to comprise, generally, a saddle or base 11 to be arranged on the pipe P, means 12 for securing the base 11 to the pipe P, a head 13 tiltably or pivotably supported on the base 11 and a standard or post 14 on the head 13 for carrying the meter M.

The saddle or base 11 is adapted to rest on the pipe P in the selected position in spaced relation to the fitting F and is intended to be secured to the pipe by the means 12. The base 11 is an integral member or casting provided at its under side with a groove or concave seat 15. The seat 15 is shaped and proportioned to conform generally to the pipe P. Ears 16 project from the opposite sides of the base 11 and the seat 15 continues along the inner sides of the ears 16. Similar ears or lugs 17 are provided on the opposite ends of the base 11 and the seat 15 continues along the under sides of the lugs.

In accordance with the invention the seat 15 is provided with spaced projecting parts or raised parts for contacting the pipe P. As best illustrated in Fig. 4 the seat 15 has a longitudinally extending raised pad 18 and similar circumferentially extending pads 19. The pad 18 is adjacent one end of the seat 15 being on the under side of one of the lugs 17. There are two transversely aligned pads 19, the pads 19 being adjacent the opposite sides of the seat 15. The pads 18 and 19 may be integral parts of the base 11 and the sides of the pads are bevelled off leaving surfaces of limited area for contacting the pipe P. The pads 18 and 19 are spaced and related so that their engagement with the pipe P holds the base 11 against tipping and rocking. The cooperation of the raised bearing pads 18 and 19 with the pipe P is such that irregularities, dents, etc. do not interfere with the even, firm engagement of the base 11 with the pipe P. The pads 18 and 19 support the base 11 so that its seat 15 is clear of the pipe and irregularities and projections on the pipe do not contact the seat to interfere with the firm mounting of the base. In the event the pipe P has dents or other irregularities the base 11 may be shifted on the pipe to a position where the lugs 18 and 19 are clear of the irregularities and so that all three pads evenly bear on the pipe. The upper side of the base 11 is provided with a longitudinally extending raised reinforcing rib 20. The upper side of the rib 20 is preferably flat and continues to the ends of the base 11 to form the upper face of the lugs 17. The ears 16 projecting from the opposite sides of the base 11 occupy a common plane spaced below the top of the pipe P.

The means 12 for securing the base 11 to the pipe P is such that the base may be easily and quickly secured to the pipe in the selected or correct position and may be easily and quickly removed from the pipe when desired. The means 12 includes a U-bolt 21 for engaging about the pipe P. The bolt 21 is arranged so that its curved intermediate portion engages the under side of the pipe P and so that its side parts or arms 22 at the opposite sides of the pipe extend upwardly. Notches or slots 23 are provided in the ears 16 to receive the upper portions of the bolt arms 22. The slots 23 preferably have downwardly divergent side walls to facilitate the easy insertion of the bolt arms 22 and to accommodate U-bolt arms that are not truly parallel. Nuts 24 are threaded on the upper parts of the bolt arms 22 and washers 25 are arranged under the nuts to bear against the upper sides of the ears 16.

In accordance with the invention tightening down of the nuts 24 automatically urges the U-bolt arms 22 toward the inner ends of the slots 23 and holds the bolt arms against outward movement from the slots. The upper surfaces 26 of the ears 16 slope downwardly and rearwardly from the mouths of the slots 23 and cooperation of the nuts 24 with the washers 25 bearing on these sloping surfaces urges the bolt arms 22 rearwardly in the slots 23 and positively holds the bolt arms against outward movement from the slots. It will be seen that the base 11 may be quickly seated in the selected position on the pipe P whereupon the bolt 21 may be engaged about the pipe and manipulated to enter the upper portions of its arms 22 in the slots 23. Before the nuts 24 are tightened down the base 11 may be shifted along the pipe and may be moved about the longitudinal axis of the pipe, as required.

The head 13 is a socket member for receiving and supporting the lower end of the standard or post 14. The head 13 is arranged at the upper side of the base 11 and its generally cylindrical central portion has a vertical opening 27 for receiving the lower part of the post 14. Lugs 28 project from the central portion of the head 13 to overlie the lugs 17 of the base 11. The lugs 28 have flat upper sides and their lower sides are upwardly and outwardly pitched and spaced some distance above the base lugs 17. The head 13 is supported on the base 11 so that it may be tilted or pivoted about an axis transverse of the seat 15 and the longitudinal axis of the pipe P. The upper side of the base 11 is provided with ridges 29 for pivotally supporting the head 13. The ridges 29 are substantially V-shaped in vertical cross section and extend outwardly from the opposite sides of the central base ridge 20. The supporting ridges 29 are in alignment and are spaced substantially midway between the ends of the base 11. The lower side of the head 13 has two downwardly projecting parts 30. The parts 30 are located at diametrically opposite sides of the opening 27 and are arranged to have substantial clearance with the central web 20 of the base 11. The lower ends of the parts 30 have downwardly facing notches 31 for receiving the upper edge portions of the ridges 29. The notches 31 are V-shaped and formed so that their cooperation with the ridges 29 allows the head 13 to freely rock or pivot on the ridges. It is preferred to construct the head 13 so that the parts 30 have substantial clearance with the central base web 20 whereby the head may be shifted along the ridges 29 in a direction transverse of the pipe P.

The head 13 is secured to the base 11 in such a manner that it may be pivoted or rocked on the ridges 29 to support the meter M in the correct position. The body lugs 17 have slots 32 entering their outer ends and the head lugs 28 are provided with vertical openings 33 for registering with the slots 32. The slots 32 have flat side walls provided with downwardly facing shoulders 34. Bolts 35 are arranged through the sets of slots 32 and openings 33. The bolts 35 are prefereably arranged so that their heads 36 are engaged in the flat walled slots 32 to bear upwardly against the shoulders 34 and so that the threaded parts of the bolts project from the upper sides of the head lugs 28. The engagement of the bolt heads 36 in the slots 32 holds the bolts 35 against turning and the engagement of the heads against the shoulders 34 holds the bolts against upward movement. Nuts 37 are threaded on the bolts 35 to engage against the upper sides of the lugs 28. The openings 33 receive the bolts 35 with substantial clearance and the bolts may shift in the slots 32 to permit movement or adjustment of the head 13 on the base 11. It will be seen that by loosening one nut 37 and tightening the other nut 37 that the head 13 may be tilted or pivoted on the ridges 29 to assume the correct or selected position. With both nuts 37 tightened down the head 13 is securely attached to the mounting base 11. The head 13 just described is such that it may be employed in connection with bases 11 designed for use on pipes of various diameters.

The post 14 is a support or standard for the meter M. The post 14 is an elongate, generally vertical member and in practice may be a length of tubing or pipe. The lower portion of the post 14 may be threaded in the opening 27 of the head 13. The meter M is suitably fixed or attached to the upper end of the post 14.

In employing the improved meter mounting of the invention the base 11 may first be arranged on the pipe P in approximately the desired position. The base 11 may be shifted or moved to a position where the raised pads 18 and 19 firmly bear on the pipe. The U-bolt 21 is then engaged about the pipe and entered in the slots 23. It will be seen how the U-bolt 21 may be easily and quickly entered in the slots 23 and how the nuts 24 may be threaded down on the bolt arms 22 to secure the base 11 to the pipe P. By leaving the nuts 24 loose the base 11 may be secured to the pipe P so that it may be shifted along the pipe and moved about the longitudinal axis of the pipe to facilitate the final correct mounting of the meter M. The head 13 may be seated on the base 11 so that the notches 31 receive the ridges 29. The bolts 35 are preferably entered in the notches 32 before arranging the head 13 on the base and when the head is arranged in position the bolts 35 are received in the openings 33. When the nuts 37 have been threaded on the bolts 35 they may be employed to rock or pivot the head 13 to bring the meter M to the correct position. In this connection it is to be observed that the base 11 may be moved about the axis of the pipe P and shifted axially of the pipe and the head 13 may be rocked or pivoted about an axis transverse of the pipe P and, if desired, bodily shifted a limited distance transversely of the pipe. These various movements or adjustments are such that the meter M may be easily and quickly brought to the correct position for operation. When it is desired to disengage the mounting from the pipe P the nuts 24 are loosed or removed and the U-bolt arms 22 are disengaged from the notches 23. This frees the base 11 for disengagement from the pipe P.

Having described only a typical preferred form and application of our invention we do not wish to be limited or restricted to the specific details herein set forth, but wish to reserve to ourselves any variations or modifications that may appear to those skilled in the art or fall within the scope of the following claims.

Having described our invention, we claim:

1. A mounting for supporting a meter on a pipe, or like object, comprising a base for seating on the pipe, a U-bolt engaging under the pipe and operable when tightened to hold the base against movement on the pipe, a head at the upper side of the base, a post on the head for carrying the meter, and means for securing the head to the base operable to pivot the head about an axis transverse of the pipe and supporting the head on the base for limited bodily movement along said axis.

2. A mounting for supporting a meter on a pipe comprising two elements, one a base to seat on the pipe, the other a head, means for securing the base to the pipe, means for supporting the meter on the head, one element having notches, ridges on the other element pivotally bearing in the notches whereby the head may be pivoted on the base to bring the meter to the selected position, and means for securing the head to the base in the selected position.

3. A mounting for supporting a meter on a pipe comprising two elements, one a base to seat on the pipe, the other a head, means for securing the base to the pipe, means for supporting the meter on the head, one element having notches disposed transversely of the pipe, bearing ridges on the other element cooperating with the notches so that the head may be pivoted about an axis transverse of the pipe and may bodily shift along said axis, and means for holding the head against movement on the base following the pivotal adjustment of the head.

4. A mounting for supporting a meter on a pipe comprising a base to be seated on the pipe, means for fixedly securing the base to the pipe, a head member, fulcrum means for supporting the head on the base for pivotal movement following the securing of the base to the pipe, screw threaded means at opposite sides of the fulcrum means operable to pivot the head member and thereafter hold the head member against movement, and means on the head member for supporting the meter.

5. A mounting for supporting a meter on a pipe, or like object, comprising a base having a seat conforming generally to the pipe, ears on opposite sides of the base, a U-bolt engaging under the pipe and having nuts cooperating with the ears to secure the base to the pipe, lugs on the opposite ends of the base, a head at the upper side of the base, fulcrum means spaced between the ends of the head supporting the head on the base to pivot relative to the base about an axis transverse of the pipe to shift bodily along said axis, lugs on the opposite ends of the head, screw elements cooperating with the lugs of the base and head operable to pivot the head and thereafter secure the head against pivoting and bodily shifting, the head having an upwardly facing socket, and a post received in the socket and projecting upwardly from the head to carry the meter.

6. A mounting for supporting a meter on a pipe, or the like, including a base to be arranged on the pipe, means for securing the base to the pipe, a head member overlying the base, means for mounting the head on the base for pivotal movement with respect thereto about an axis transverse of the pipe and for limited bodily movement along said axis, means for securing the head against such movement, and means on the head for supporting the meter.

PATRICK HENRY ROBINSON.
WILLIAM C. ROBINSON.